June 24, 1958 C. W. LEWIS 2,840,627
LIQUID DIELECTRICS AND APPARATUS EMBODYING THE SAME
Filed Sept. 4, 1952

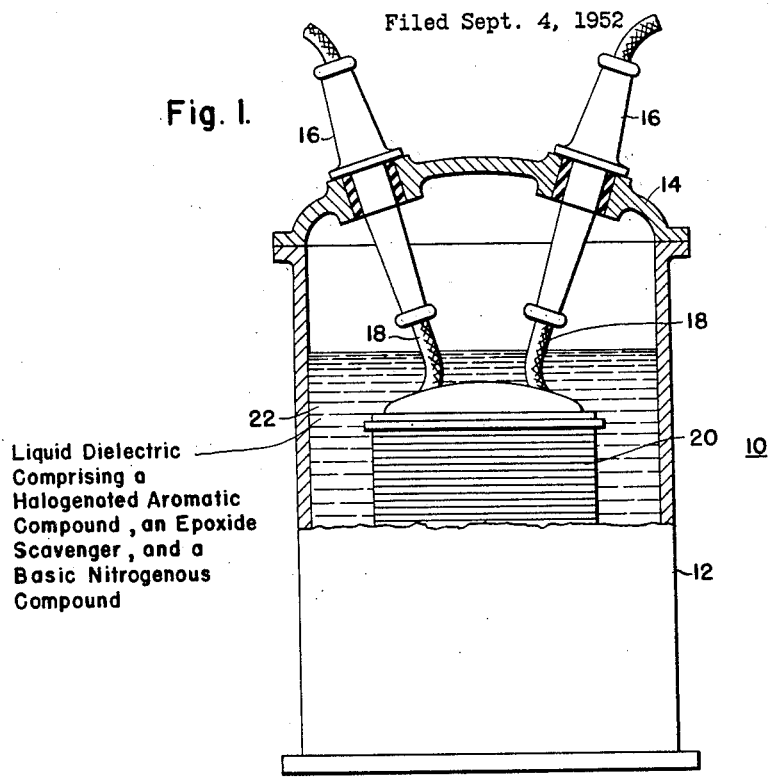

Fig. I.

Liquid Dielectric Comprising a Halogenated Aromatic Compound, an Epoxide Scavenger, and a Basic Nitrogenous Compound

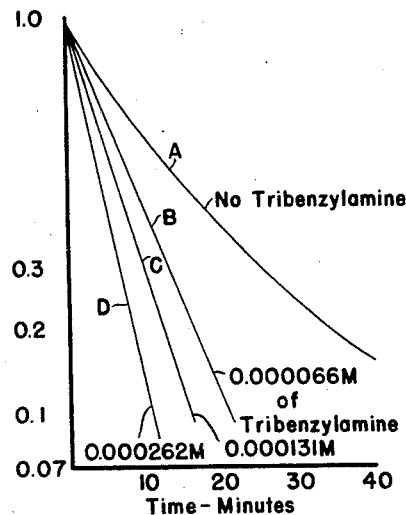

Fig. 2.

Reaction Rates of Absorption of HCL by Phenoxy Propene Oxide In Presence of Tribenzylamine WITNESSES:
John E. Heasley
Ww. C. Groome INVENTOR
Charles W. Lewis
BY
Frederick Shapoe
ATTORNEY 2,840,627
Patented June 24, 1958

2,840,627

LIQUID DIELECTRICS AND APPARATUS EMBODYING THE SAME

Charles W. Lewis, Pittsburgh, Pa., assignor to Westinghouse Electric Corporation, East Pittsburgh, Pa., a corporation of Pennsylvania Application September 4, 1952, Serial No. 307,933

5 Claims. (Cl. 174—17)

This invention relates to novel liquid dielectric compositions and electrical apparatus embodying the same.

At the present time, halogenated aromatic compounds are employed extensively as liquid dielectrics for insulating electrical apparatus. In particular, chlorinated diphenyl base compositions are employed in transformers for cooling and insulating the windings thereof. However, an electrical arc in the apparatus will cause dissociation of the chlorinated diphenyl with evolution of hydrogen chloride. The hydrogen chloride will attack the copper, paper and other materials employed in the construction of transformers. Many electrical arcs persist for only a brief period of time and if there were some means available for absorbing the evolved hydrogen chloride, no corrosion or deterioration of a permanent or undesirable nature would take place.

It has been suggested to include in the halogenated dielectrics a scavenger capable of removing or reacting with the hydrogen chloride. To be effective in removing small amounts of evolved hydrogen chloride, any scavenger should be rapidly effective to prevent the hydrogen chloride from materially reacting with copper, iron and the other materials employed in the transformer.

The object of this invention is to provide a novel liquid dielectric composition comprising halogenated aromatic compounds, an epoxy compound and a basic nitrogenous compound capable of forming a salt with hydrogen halide, whereby the rate of reaction of the epoxy compound with evolved hydrogen halide is greatly accelerated.

Another object of the present invention is to provide electrical apparatus embodying a halogenated aromatic dielectric liquid, at least one epoxy compound, and a tertiary amine capable of forming a salt with hydrogen halide, whereby the rate of reaction of the epoxy compound with evolved hydrogen halide in the liquid dielectric is greatly accelerated.

Other objects of the invention will, in part, be obvious and will, in part, appear hereinafter. For a better understanding of the nature and objects of the invention reference should be had to the following description and drawing, in which:

Figure 1 is a view in elevation, partly in section, of a transformer, and

Fig. 2 is a graph plotting against time the amount of hydrogen chloride remaining in a given composition prepared in accordance with the invention.

I have discovered that chlorinated aromatic dielectric liquids may be combined with (a) certain epoxy compounds which will react with evolved hydrogen halide and (b) extremely small amounts of basic nitrogenous compounds which form salts with hydrogen halide, such salts either being formed in situ or originally added, which salts greatly accelerate the rate of reaction of the hydrogen halide with the epoxy compound, whereby any evolved hydrogen halide is rapidly absorbed or reduced to harmless proportions and thereby any electrical apparatus embodying such dielectric composition is rendered more effective.

The major portion, about 95% to 99.9%, of the dielectric composition comprises halogenated aromatic compounds such, for example, as chlorinated diphenyl, chlorinated benzene, chlorinated alkyl benzene, and mixtures thereof. A widely employed composition comprises at least 50% by weight of chlorinated diphenyl in which from 40% to 60% of the hydrogen atoms have been replaced with chlorine, for instance, pentachlorodiphenyl, the remainder of the composition being a chlorinated benzene compound such, for example, as trichlorobenzene.

The halogenated aromatic dielectric has admixed therewith from 0.05% to 5% by weight of an epoxy compound having the group

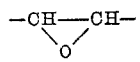

The epoxy compound functions as a scavenger for any evolved hydrogen chloride, since it will react with free hydrogen chloride to produce a relatively inert reaction product. Suitable epoxy compounds are glycidol and ethers thereof, and derivatives of ethylene oxide. Specific examples thereof are, phenoxypropene oxide, glycidyl allyl ether, benzyl ethylene oxide, styrene oxide, 1,3-bis(2,3-epoxypropoxy)benzene, and 4,4'-bis(2,3-epoxypropoxy)diphenyldimethylmethane. Mixtures of any two or more of such epoxy compounds may be employed.

It has been discovered that the rate of reaction of hydrogen chloride with the epoxy compounds is such that a prolonged period of time is required to react with, say, 99% of the hydrogen chloride. The reaction time to remove 90% of the hydrogen chloride from a given dielectric having 0.001 mole of HCl present may be as much as 40 to 60 minutes. It will be appreciated that due to such long reaction time, free hydrogen chloride in the dielectric will react appreciably with copper, cellulose, iron and other materials of which the electrical apparatus is constructed. It is desirable that the reaction time be substantially reduced so that the hydrogen chloride will be removed by reaction with the epoxy compound at a much greater rate in order that only traces of hydrogen chloride be present in, for example, from 10 to 20 minutes, after it has been evolved from the halogenated dielectric.

In order to greatly accelerate the rate of reaction of the epoxy compound with hydrogen chloride, I have found that small amounts of basic nitrogenous compounds capable of forming a salt with hydrogen chloride, as well as the hydrogen chloride salts thereof, should be added to the halogenated dielectric containing an epoxy compound. If the basic nitrogenous compounds are present in the liquid dielectric, any hydrogen chloride generated therein subsequently will promptly form the hydrochloride salt thereof. The basic nitrogenous compounds and their hydrochloride salts comprise amines, guanidines and quaternary ammonium compounds. Tertiary amines are particularly suitable. Specific examples are tribenzylamine, primary benzylamine, octylamine, dibutylamine, diphenyl guanidine, and the hydrogen chloride and hydrogen bromide salts of each of the foregoing, and cetyl trimethyl ammonium bromide.

The amount of these basic nitrogenous compounds or halide salts may be as little as 0.001% of the weight of the liquid dielectric and will provide a substantial increase in reaction rate of the hydrogen chloride with the epoxy compound. Considerably more of the basic nitrogenous compounds may be added, for example 0.02% by weight or more. It is preferable to add the non-halogenated basic nitrogenous compound because it is readily soluble in the dielectric. It is desirable not to add the basic nitrogenous compound in amounts larger than the saturation limit of the resulting hydrochloride salt thereof. The basic nitrogenous compound is considerably more soluble in the halogenated aromatic dielectrics than the hydrochloride salt thereof. Any excess of the basic nitrogenous compound will result in a fine precipitate forming when hydrogen chloride is subsequently evolved in the dielectric and such precipitate is quite difficult to remove from the surfaces of the electrical member.

Referring to Fig. 1 of the drawing, there is illustrated a transformer 10 comprising a sealed casing 12 including a cover 14 through which are disposed bushings 16 having conductors 18 in circuit with a coil 20 within the casing. The coil 20 comprising one or more electrical conductors is immersed in a liquid dielectric 22 to provide for insulating the electrical conductors and for dissipating the heat evolved during operation thereof to the walls of the casing 12. The dielectric 22 comprises a halogenated aromatic compound or a mixture of two or more such compounds, an epoxy scavenger and a reaction accelerator comprising a basic nitrogenous compound, for example, tribenzylamine. Ordinarily, it will be preferable to mix the components of the dielectric 22 before it is introduced into the casing 12. However, the separate components may be individually placed within the casing 12 and they will readily admix by mutual solution.

If an electrical arc occurs in the conductors 18 or winding 20, the halogenated aromatic compound will be dissociated to produce hydrogen halide. When this occurs, the epoxy compound will react with the hydrogen halide at a given rate. However, the rate of reaction decreases rapidly. The tribenzylamine will be promptly converted to the hydrogen halide salt and the resulting hydrogen chloride salt will increase the rate of reaction between the hydrogen halide and the epoxy compound to a marked degree.

Referring to Fig. 2 of the drawing there is illustrated the reaction curves of four different compositions. Each composition comprised approximately 99.9% by weight of a mixture comprising 60% by weight of pentachlorodiphenyl and 40% by weight of trichlorobenzene, and 0.11% by weight of phenoxypropene oxide. Four separate lots of this composition were prepared. To one of the lots there was added 0.0012% by weight of tribenzylaminehydrochloride; to another lot there was added 0.0024% by weight of tribenzylaminehydrochloride; and to the third one there was added 0.0049% by weight of tribenzylaminehydrochloride; and the fourth lot had no amine present therein. Into each of the four lots of the liquid compositions so prepared, there was added approximately 0.0005 mole per liter of hydrogen chloride. The amount of free hydrogen chloride remaining in each lot was determined at short intervals of time, and the fraction of free hydrogen chloride remaining was plotted against time as shown in Fig. 2 of the drawing.

Curve A was drawn from the lot containing no tribenzylaminehydrochloride additive. It will be seen that even after 40 minutes, approximately 15% of the added hydrogen chloride was still free. The reaction rate was decreasing with decrease in concentration of hydrogen chloride. I would have required several hours to reduce the amount of free hydrogen chloride to a few percent of the originally added hydrogen chloride. Curve B shows the rate of reaction when 0.0012% of tribenzylaminehydrochloride is present. The rate of reaction has been so greatly accelerated over the rate taking place in the lot for which curve A was drawn, that at the end of approximately 25 minutes, there is less than 8% of the original hydrogen chloride present in the liquid. Curves C and D indicate progressively more rapid rates of removal of the hydrogen chloride. It will be appreciated that only extremely small fractions of the free hydrogen chloride are present after a matter of less than 20 minutes in the lots of compositions of curves C and D. Therefore, the corrosive action and deterioration caused by the hydrogen chloride would be proportionately low, whereby much more effective protection against such deterioration is obtained.

It should be noted that the reaction rate falls off much more rapidly in curve A than in curves B to D, as the amount of residual hydrogen chloride in each case becomes smaller. Without the added basic nitrogenous compound, the rate of removal of hydrogen chloride by the epoxy compound alone is proportional to the 3/2 power of the concentration of the hydrogen chloride, whereas with the salt of the basic nitrogenous compound present the rate is proportional to the first power of the hydrogen chloride concentration.

Other tests show that the addition of the tribenzylamine, as such, in the small amounts indicated herein to the liquid dielectric will accelerate the removal of the hydrogen chloride by the epoxy compound in a similar fashion. When 0.02% of tribenzylamine is present the reaction is so rapid that there is no practical way of measuring the concentration of residual hydrogen chloride. In only a few minutes there has been substantially complete removal of the hydrogen chloride by the epoxy compound.

In the small amounts herein indicated the basic nitrogenous compounds are not harmful to the liquid dielectric. The tertiary amines are not ionized substantially in the dielectrics and have little or no effect on the dissipation factor of the dielectric.

The invention has been described with reference to specific compounds, but it is to be understood that such illustrations are exemplary and not limiting.

I claim as my invention:

1. A dielectric composition consisting essentially of a chlorinated aromatic dielectric liquid as the major component, the halogenated aromatic liquid giving off hydrogen chloride when subjected to arcing, from 0.05% to 5% by weight of at least one epoxy compound having the group

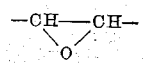

dissolved in the dielectric liquid, to react with any evolved hydrogen chloride, and from 0.001% by weight of a tertiary amine capable of forming a salt with hydrogen chloride up to the amount that produces a saturated salt solution whereby the rate of reaction of the epoxy compound with evolved hydrogen chloride is accelerated.

2. A dielectric composition comprising at least about 95% by weight of chlorinated aromatic compounds selected from the group consisting of 40% to 60% chlorinated diphenyl, and chlorinated benzene, at least half the weight of the chlorinated aromatic compound being chlorinated diphenyl, from 0.05% to 5% by weight of phenoxypropene oxide and from 0.001% to 0.02% by weight of tribenzylamine to accelerate the rates of reaction between the phenoxypropene oxide and any hydrogen chloride evolved from the chlorinated aromatic compound.

3. A dielectric composition consisting essentially of a chlorinated aromatic dielectric liquid as the major component, the halogenated aromatic liquid giving off hydrogen chloride when subjected to arcing, from 0.05% to 5% by weight of at least one epoxy compound having the group

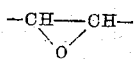

dissolved in the dielectric liquid, to react with any evolved hydrogen chloride, and at least 0.001% by weight of an accelerator selected from the group consisting of basic nitrogenous compounds and hydrochloride salts thereof, up to the amount that produces a saturated hydrochloride solution in the halogenated liquid dielectric.

4. Electrical apparatus comprising, in combination, a casing, an electrical conductor in the casing, and a liquid dielectric disposed in the casing to insulate the conductor and to dissipate heat developed in the conductor, the dielectric consisting essentially of a chlorinated cyclic dielectric liquid as the major component, the halogenated cyclic liquid giving off hydrogen chloride when subjected to arcing, from 0.05% to 5% by weight of at least one epoxy compound having the group

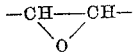

dissolved in the dielectric liquid, to react with any evolved hydrogen chloride, and from 0.001% to 0.02% by weight of a basic nitrogenous compound capable of forming a salt with hydrogen chloride whereby the rate of reaction of the epoxy compound with evolved hydrogen chloride is accelerated.

5. Electrical apparatus comprising, in combination, a casing, an electrical conductor in the casing, and a liquid dielectric disposed in the casing to insulate the conductor and to dissipate heat developed in the conductor, the dielectric comprising essentially 95% by weight of chlorinated cyclic compounds selected from the group consisting of 40% to 60% chlorinated diphenyl, and chlorinated benzene, at least half the chlorinated cyclic compound being chlorinated diphenyl, from 0.05% to 5% by weight of phenoxypropene oxide and from 0.001% to 0.02% by weight of tribenzylamine.

References Cited in the file of this patent

UNITED STATES PATENTS

| | | |
|---|---|---|
| 2,094,367 | Missbach | Sept. 28, 1937 |
| 2,672,504 | Hardy | Feb. 3, 1953 |

FOREIGN PATENTS

| | | |
|---|---|---|
| 601,359 | Great Britain | May 4, 1948 |

OTHER REFERENCES

Berberich et al.: J. Ind. & Eng. Chem., Jan., 1948, vol. 40, No. 1, page 118. (Copy in 317–259.)